United States Patent
Schmidt et al.

(10) Patent No.: US 7,302,045 B2
(45) Date of Patent: Nov. 27, 2007

(54) SYSTEM AND METHOD FOR MONITORING TIME-RELATED CONNECTION DATA DETECTED BY A NETWORK NODE

(75) Inventors: Monika Schmidt, Nuremberg (DE); Ernst Schneider, Langenzenn (DE)

(73) Assignee: Deutsche Telekom AG, Bonn (DE)

( * ) Notice: Subject to any disclaimer, the term of this patent is extended or adjusted under 35 U.S.C. 154(b) by 169 days.

(21) Appl. No.: 10/530,921

(22) PCT Filed: Jul. 17, 2003

(86) PCT No.: PCT/DE03/02393

§ 371 (c)(1),
(2), (4) Date: Oct. 6, 2005

(87) PCT Pub. No.: WO2004/034688

PCT Pub. Date: Apr. 22, 2004

(65) Prior Publication Data

US 2006/0109962 A1    May 25, 2006

(30) Foreign Application Priority Data

Oct. 8, 2002    (DE) ............................ 102 46 883

(51) Int. Cl.
*H04M 1/24*    (2006.01)
*H04M 3/08*    (2006.01)
*H04M 3/22*    (2006.01)
*H04M 15/00*   (2006.01)

(52) U.S. Cl. ............... 379/9; 379/10.02; 379/15.01; 379/121.01; 379/126

(58) Field of Classification Search ............ 379/1.01, 379/9, 9.04, 10.01, 10.02, 12–14, 15.01, 379/15.03, 18, 22, 27.01, 121.01, 121.04, 379/121.06, 126

See application file for complete search history.

(56) References Cited

U.S. PATENT DOCUMENTS 5,359,646 A * 10/1994 Johnson et al. .......... 379/27.02

(Continued)

FOREIGN PATENT DOCUMENTS

DE    42 13 883    11/1993

(Continued)

OTHER PUBLICATIONS

B.Stühn "Einführung in die Physik I; WS2001/2002; Stichwortsammlung" Skript: Einführung in die Physik I, 'Online!—2001 pp. 1-8, XP002257410.

*Primary Examiner*—Binh K. Tieu
(74) *Attorney, Agent, or Firm*—Kenyon & Kenyon LLP

(57) ABSTRACT

A method and system for verifying the connection-related communications data registered by a network node, where the connection-related communications data are used for the calculation of charges includes establishing at least one predetermined test communication connection. By clearing the predetermined test communication connection via the network node and registering a time of an event, the system and method registers the time of at least one additional event for calculating charges at a predetermined measuring point lying outside of the network node. A systematic temporal measuring error is determined. A reference data record containing time-related data and a connection-related communications data record generated is generated. The method corrects the time-related data of the reference data by the ascertained systematic temporal measuring error and compares the reference data record to the connection-related communications data record to determine if a difference lies within a predetermined range.

13 Claims, 2 Drawing Sheets

U.S. PATENT DOCUMENTS 5,369,680 A * 11/1994 Borbas et al. ........... 379/10.02
5,729,588 A    3/1998 Chin et al.
5,864,608 A *  1/1999 Brownmiller et al. . 379/112.06
5,940,472 A *  8/1999 Newman et al. ......... 379/10.02

FOREIGN PATENT DOCUMENTS

DE    199 12 414    9/2000

* cited by examiner

| Start Time | Destination Address | Source Address | Service Type | Service Feature | Date | End Time | Test Case Number |
|---|---|---|---|---|---|---|---|
| | | | | | | | |

FIG. 2

SYSTEM AND METHOD FOR MONITORING TIME-RELATED CONNECTION DATA DETECTED BY A NETWORK NODE

FIELD OF THE INVENTION

The present invention relates generally to communication system and method for verifying the connection-related communications data registered by a network node, and more specifically to verifying connection-related communication data registered by a switching network node of a telecommunications network, which are used for calculating charges.

BACKGROUND OF THE INVENTION

An essential performance characteristic of switching exchanges in a telecommunications network is the registration of charge data accumulated during a connection as well as in the use of a service. For this purpose, all communications data required for calculating the charges is registered for every communications connection in the switching exchange. Appropriate test systems verify the accuracy of the communications data registration.

Such a test system is known from DE 199 12 414 A1, for example. This test system, however, suffers from the fact that time-related events such as the start of a connection and the end of a connection can be registered only in an imprecise manner. Consequently, these methods are not suited to verify whether the narrow tolerance limits specified for the registration of charge data are maintained.

Script XP 002257410 Introduction to Physics I (0000) discusses, among other things, measuring errors. Every measuring result is impaired by random and systematic errors, the systematic errors being determined by the reading accuracy and the calibration precision of a measuring device.

SUMMARY OF THE INVENTION

One objective of the present invention is to provide a system and a method with which it is possible to verify the correctness of the communications data records provided by a network node even when the registration precision of time-related events relative to a standard time must adhere to narrow tolerance limits.

The present invention provides for specifying the time-related data for a communications connection registered in the test system in a more precise manner. The measurement accuracy is improved by, among other things, the fact that the measuring points for registering events required for calculating charges are chosen so that the systematic measuring error is minimized. This measuring error is taken into account for correcting the time-related data ascertained in the test system.

A method is employed for verifying the communications data registered by a network node, which are used for calculating the charges. The network node may be, for example, a switching network node of a digital or analog fixed network, for example. According to the verification method, it is possible to establish and to clear again at least one predetermined test communications connection via at least this network node between a calling subscriber and at least one called subscriber. The available test communications connections may be, for example, a three-party conference connection or a relayed or rerouted connection. First, the time of an event required for calculating charges is registered at a predetermined measuring point and in the network node, at which the event may actually occur. Then the time of at least one additional event required for calculating charges is registered at the predetermined measuring point or at least one additional predetermined measuring point and in the network node at which this event may actually occur. The location at which the respective event actually occurs is suitably that interface of the network node registering the charge-related data at which this network node is first able to detect the respective event.

The measuring points lie outside of the network node. The times of the occurrence of the actual event and of the event detected at the measuring points differ because the measuring points are located at a distance from the location of the occurrence of the actual event, wherein the location is associated with the network node. This temporal difference is called a systematic measuring error between the location of the actual event and the respective measuring point. The systematic measuring error is a function of the chosen test procedure and must therefore be ascertained for every test scenario. To increase the measuring accuracy of the verification method, the systematic temporal measuring error between the location of the actual event and each predetermined measuring point is ascertained. Following the termination of the test communications connection, a reference data record is produced, which contains time-related data that are generated from the events registered at the measuring point or measuring points. Furthermore, at least one connection-related communications data record is produced in the network node, which contains time-related data that describe the events registered in the network node. An increased measuring accuracy is now achieved in that the time-related data of the reference data record are corrected by the ascertained systematic temporal measuring error. Subsequently, the reference data record generated with reference to the test communications connection is compared with the at least one communications data record. In addition, a determination is made as to whether the difference between the time-related data of the communications data record and of the reference data record lies within a predetermined range. In this manner, it is possible to verify the validity of the communications data record with respect to time-related data. At this point, it should be noted that time-related data may be the time of the start of the connection and/or the time of the end of the connection, the duration of the connection or the duration of use, the start and/or the end of a service feature requested during an existing connection.

Hence the events may be the start and/or the end of the test communications connection and/or the start and/or the end of at least one service feature requested during the existing telecommunications connection.

In the exemplary case of an ISDN connection, the start of the connection is indicated by a protocol message "connect" produced by the called subscriber and the end of a connection is indicated by a protocol message "disconnect" which is produced by the subscriber who terminates the connection.

In the case of an analog subscriber connection, the start of the connection is signaled by a loop closure and the end of the connection is signaled by a loop interruption.

To register the time of the occurrence of an event at the measuring points, the measuring points are assigned at least one system clock. Alternatively, every measuring point may be assigned a system clock of its own. To be able to determine precisely the time of the occurrence of an event in a measuring point relative to a standard time, which is emitted for example by the standard time transmitter DCF77 in Mainflingen, the system clock or the system clocks are synchronized with the standard time. The frequency of the synchronization depends on the accuracy with which the respective system clocks run. Due to the transmission time of the standard time to the system clocks and their reaction time, the synchronization of the system clocks results in a time delay with respect to the standard time. This systematic error may be used for correcting the time-related data of the reference data record.

The measuring points are suitably chosen in such a way that the occurring systematic measuring error between the location of the actual event and the respective measuring point is as small as possible. This may be achieved in that the called subscriber of the test communications connection is chosen as the measuring point at which the start of the connection is to be registered and the subscriber who terminates the test communications connection is chosen as the measuring point at which the end of the connection is to be registered. In both cases, the measured time thus lies before the actual start of the connection and/or end of the connection.

The initiating subscriber of the use of the service feature may be used as the measuring point at which the start of the use of a service feature requested during an existing test communications connection is to be registered and the subscriber who terminates the use may be chosen as the measuring point at which the end of the use of the service feature is to be registered.

To determine the duration of a test communications connection, the temporal duration between the events "start of connection" and "end of connection" must be ascertained in the measuring system. The duration may be calculated as the temporal difference between the two times at which the events occur. This has the disadvantage, however, that rounding-off errors add up in the representation of the start and end time. For this reason, the time-related data of the reference data record include the duration of the connection which is ascertained by a timer that is started by the start of the connection registered at the measuring point and that is stopped by the end of the connection registered at the measuring point or at another measuring point. This has the additional advantage that no measuring deviations arise by the synchronization of the system clock at the measuring point with the time standard.

The term "communications data" includes, among other things, communication elements as well as the start and end times and the duration of the associated test communications connection and of the requested service features. The term "communications element" includes, among other things, parameters such as destination address and source address of the test unit, date of the communications connection, service type, service feature and the like. Services are, for example, telephony, ISDN or ANIS subscribers, data communications and the like. Service features include, for example, three-party conference, brokering and the like. The above-mentioned technical problem is likewise solved by a verification system, which contains at least one call simulator connectible to the network node. The call simulator has a system clock, a device for establishing and clearing at least one predetermined test communications connection, at least one device for generating predetermined events required for calculating charges, at least one device for registering the times of at least some of the events required for calculating charges and a device for generating a connection-related reference data record containing time-related data that describe the registered events. The network node has a device for registering the times of at least some of the events required for calculating charges, a system clock and a device for generating at least one connection-related communications data record containing time-related data that describe the events registered in the network node. Further, a correction device assigned to the call simulator is provided, in which a correction value is stored, which corresponds to the systematic temporal measuring error between the occurrence of an actual event and the registering of this event at the registration device of the call simulator, the time-related data of the reference data record being corrected by the stored systematic temporal measuring error in the correction device. A comparator unit is used to compare the reference data record with the at least one communications data record. A determination is made in a determination device as to whether the difference between the time-related data of the communications data record and of the reference data record lies within a predetermined range.

Since the call simulator and the network node usually employ different data record formats, a first device for converting the format of the reference data record and a second device for converting the format of each communications data record into a uniform format are additionally provided. This measure avoids the limitation that only call simulators that work with the format of the digital switching exchange can be used in the verification system.

In a generally known manner, a communications data record and a reference data record include a plurality of predetermined data fields. Communications data are stored in each data field of a communications data record and reference data record. Moreover, each data field may be assigned a range of values, within which communications data contained in the data field must lie. Thus, for example, the range of values for the data field "date of the communications connection" may be defined by the Gregorian calendar, while the range of values of the data field "start time of the connection" may be defined by the time range from 0 to 24 hours. The range of values for the "service type" data field may be defined by a predetermined set of services, while the range of values of the "service feature" data field may be defined by all authorized service features.

The verification system is able to detect the communications data records assigned to a test communications connection, particularly when, for reasons of security, new communications data records are ascertained at regular time intervals for an existing communications connection. A plurality of communications data records is recognized as belonging together in one connection by the fact that the same connection-identifying data content (for example the destination and/or source address) is contained in each communications data record. For this case, the comparator unit is designed so as to compare the connection-related reference data record to each of the merged, connection-related communications data records. The verification system further detects that an individual communications data record of the merged communications data records belongs to the corresponding reference data record if the start and end time stamps of the individual communications data record lie within the time interval defined by the start and end time stamps of the reference data record. The start time stamps of the merged communications data records define a time sequence in the communications data records. The verification system recognizes the sequence of related communications data records to be correct if in the immediately subsequent communications data record the start time stamp corresponds to the end time stamp of the immediately preceding communications data record, and if the time span defined by the start time stamp of the first communications data record and the end time stamp of the last communications data record corresponds to the total duration of the test communications connection defined by the start time stamp and the end time stamp of the reference data record.

BRIEF DESCRIPTION OF THE DRAWINGS

The present invention is explained in more detail in the following on the basis of an exemplary embodiment in conjunction with the enclosed drawings.

FIG. 1 illustrates the schematic structure of the verification system according to the present invention and FIG. 2 illustrates an exemplary format of a communications data record and reference data record.

DETAILED DESCRIPTION

Figure 1:
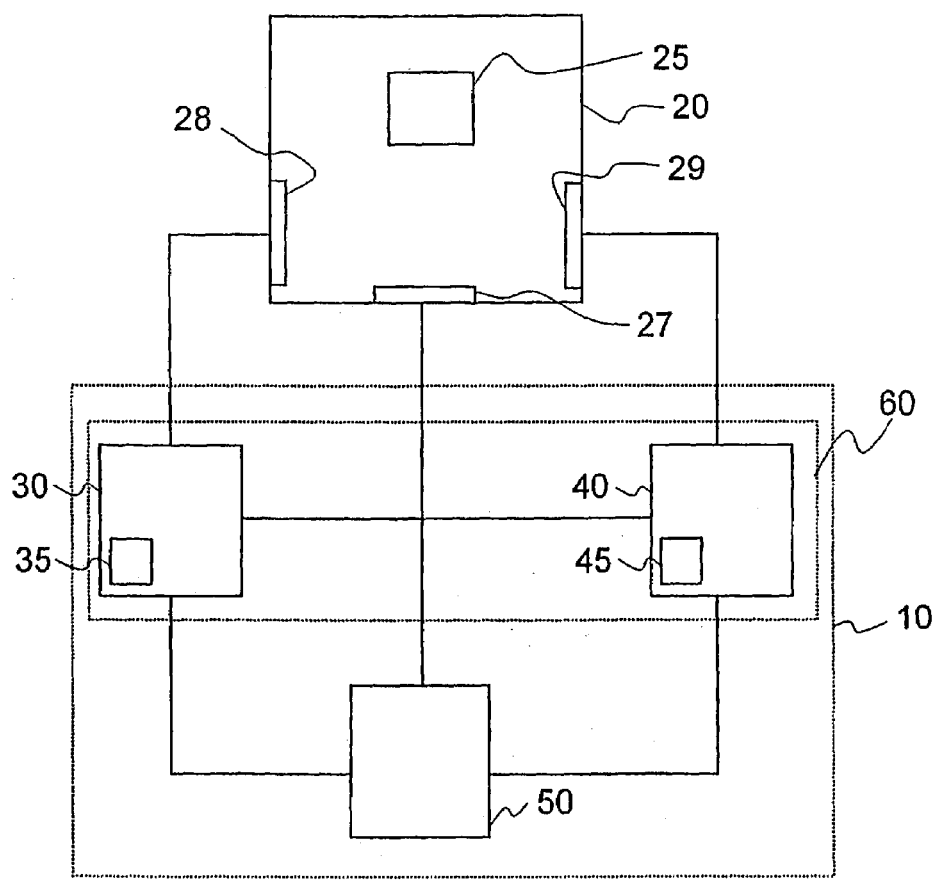

FIG. 1 shows the schematic structure of an exemplary verification system 10, which is connected to at least one telecommunications network node to be verified, which in the example provided is a digital switching exchange 20. Verification system 10 contains a call simulator 60, which has for example a device 30 for simulating a calling subscriber and a device 40 for simulating a called subscriber. Devices 30 and 40 are respectively assigned a system clock 35 and 45, which are synchronized with the standard time of a standard time clock, for example the DCF77 transmitter. Alternatively, a shared system clock may be assigned to both devices 30 and 40. Call simulator 60 and switching exchange 20 are connected to an evaluation device 50. Devices 30 and 40 of call simulator 60 are each connected for example via a subscriber-side telecommunications line to associated digital switching exchange 20. In accordance with the ISO 9646 standard, call simulator 60 and evaluation device 50 are able to communicate in each case via a so-called point of control and observation (PCO) with an implementation under test (IUT), which is embedded in digital switching exchange 20 to be verified. In addition, call simulator 60 is designed such that, as a function of a selected test case, it is able to transmit the associated communications elements—also referred to as abstract service primitives (ASP)—via the first point of control and observation and the respective subscriber-side telecommunications line to digital switching exchange 20. The communications elements, which had been previously stored in the call simulator as a function of the test case selected, may be, for example, the destination address, the source address, the date of the test communications connection, service types and service features. Via a standardized hardware interface 27 of digital switching exchange 20 to be verified, the communications data records generated by digital switching exchange 20 may then be transferred via the second point of control and observation to evaluation device 50.

In the following, the functioning and operation of verification system 10 is explained in more detail using a representative scenario.

Generally speaking, the purpose of verification system 10 is to validate communications data records generated in digital switching exchange 20, which are used to calculate the charges for a fee-based communications connection. In particular, the purpose of verification system 10 is to validate the registration of time-related data, for example of the start and end times as well as the duration of a communications connection, in a switching network node. Only when the communications data records are correctly generated can an error-free calculation of charges be made.

To be able to verify the communications data records, the connection data used within switching exchange 20 for generating the communications data records must be available as reference data records in the call simulator. Connection data are items of information that are required by call simulator 60 for establishing and clearing a connection and that are transmitted to switching exchange 20. In this context, call simulator 60 generates a connection-related reference data record from the connection data that are transmitted to switching exchange 20 and from the time-related data registered during the test sequence. An exemplary structure of a communications or reference data record is shown in FIG. 2. The communications or reference data record is composed of, for example, the data fields "start time", "destination address", "source address", "service type", "service feature", "date", "end time" and "test case number". In another embodiment, instead of a start time or end time, the reference data record may contain the duration of the connection.

In validating communications data records, it is necessary to be able to establish that the time-related data, such as, for example, the start, end and duration of the connection, stored therein lie within a specified tolerance range of, for example, 500 ms. Accordingly, high demands must be placed on the verification system regarding the registration of the times for the start, the end and the duration of a connection since these time-related data in a reference data record represent the actual time of an event and the actual duration of the connection.

The measuring accuracy of verification system 10 depends essentially on the deviation of utilized system clocks 35 and 45 from a time standard, which may be distributed via the standard time transmitter DCF77, as well as on systematic and random measuring errors. The random measuring errors result for example from rounding-off errors and fluctuating processing times of call simulator 60. They form the range, within which no statement is possible as to whether the time-related data stored in the communications data records lie within the predetermined tolerance range.

Systematic measuring errors arise from the fact that the events "start of connection" and "end of connection" occur and are registered at different locations. That is to say, on the one hand, they occur at a predetermined interface 28 or 29 of switching exchange 20 and are registered, on the other hand, at a predetermined interface or a predetermined measuring point of call simulator 60. The measuring point lies outside of switching exchange 20 so as to prevent switching exchange 20 from being influenced by switching on call simulator 60. This has the consequence that it is not the actual event "start of connection" or "end of connection" that is detected, but only events that precede or follow the actual events. The systematic measuring error is a function of the chosen test procedure and is ascertained in advance.

The criteria for the selection of suitable measuring points may be determined by using an exemplary test case, which may be composed of a single test step or of several parallel or sequential test steps. For the present test case, let it be assumed that an ordinary telephone connection is to be established between two ISDN terminals, that is, between devices 30 and 40. Therefore, the service "telephone connection between ISDN units" is used as a service type. Let it be assumed that device 30 simulates the calling subscriber and device 40 simulates the called subscriber. The test case selected also determines the destination and source address of the two subscribers as well as the systematic measuring error. The date and start time result from the time at which the test communications connection is established. All these communications elements associated with the selected test case are stored in a memory of call simulator 60. The systematic measuring error may also be stored in evaluation device 50.

The location of the measuring points is preferably chosen in such a way that the associated systematic measuring error becomes as small as possible. Thus, for the above-mentioned example, the measuring point, in which the event "start of connection" is registered, is located at called subscriber 40. The registered event "start of connection" corresponds to the protocol message that is generated by called subscriber 40 for initiating a connection. The measuring point, in which the event "end of connection" is registered, is located at the subscriber who terminates the connection. For the end of a connection is signaled to the switching exchange in that the respective subscriber generates the protocol message "disconnect". In the present example, it shall be assumed that subscriber 40 initiates the connection. The systematic errors to be taken into account for this test case are known and are stored for example in evaluation device 50. The systematic measuring errors correspond approximately to the propagation time which the protocol message "connect" requires from subscriber 40 to switching exchange 20 or which the protocol message "disconnect" requires from subscriber 40 to the switching exchange.

Prior to the start of the test, provisions must be made to ensure that all terminals of digital switching exchange 20 not belonging to the test configuration are inactive, and that they cannot be activated during the test sequence. This is a precondition for being able to verify whether the communications data records generated during the course of the test can be assigned to a specific reference data record.

At the start of the test procedure, the communications elements associated with the test are transmitted from device 30 of call simulator 60 to digital switching exchange 20. Depending on the communications elements received, digital switching exchange 20 establishes the selected test communications connection to subscriber 40 having the appropriate destination address.

With the help of system clock 45, the time of the occurrence of the event "start of connection", which coincides with the generation of the protocol message "connect", is registered in device 40 and is written into the reference data record associated with this test connection. At the same time, a timer (not shown) is started by the event "start of connection" so as to be able to measure the duration of the test connection. In a similar manner, with the help of system clock 25, switching exchange 20 registers the time at which the protocol message "connect" arrives at interface 29. This time is written into the communications data record associated with the test connection.

To trigger the test communications connection, subscriber 40 generates the protocol message "disconnect" and transmits it to switching exchange 20. With the help of system clock 45, the time of the occurrence of the event "end of connection", which coincides with the generation of the protocol message "disconnect", is registered in device 40 and is written into the reference data record associated with this test connection. At the same time, the timer is stopped by the event "end of connection" so as to end the measurement of the duration of the connection. Following the termination of the test communications connection, call simulator 60 generates a reference data record from the communications elements associated with the chosen test as well as from the start and end times of the test communications connection, an exemplary format of the reference data record being shown in FIG. 2. Instead of the end time, it is also possible to write the duration of the connection into the reference data record. At this point, it should be mentioned that the start and end time or the duration of the connection are corrected by the systematic measuring error prior to entry into the reference data record or only in evaluation device 50. This reference data record is then transmitted to evaluation device 50. In a similar manner, with the help of a system clock 25, switching exchange 20 registers the time at which the protocol message "disconnect" arrives at interface 29. Digital switching exchange 20 also forms a corresponding connection-related communications data record from the received communications elements and the start and end time of the test communications connection. The generated communications data record is likewise transmitted to evaluation device 50.

If this has not happened yet, the time-related data stored in the reference data record such as, for example, start, end and or duration of the connection may be corrected by the systematic measuring error in evaluation device 50. If instead of the end of the connection only the duration of the connection is transmitted in the reference data record, then the end of the connection may first be calculated from the start of the connection stored in the reference data record and the duration of the connection. Subsequently, the corresponding time data of the reference data record and of the communications data record are subtracted from each other in order to determine whether the respective differential value lies within the specified tolerance range.

It should be pointed out that, with the aid of call simulator 60, it is possible to establish a plurality of test communications connections simultaneously via digital switching exchange 20. It is also conceivable to establish a plurality of test communications connections between various call simulators via digital switching exchange 20. For this purpose, the evaluation device is designed in such a way that the reference and communications data records of various test communications connections may be analyzed in parallel and verified for accuracy.

What is claimed is:

1. A method for verifying the connection-related communications data registered by a network node, where the connection-related communications data are used for the calculation of charges, the method comprising:

establishing at least one predetermined test communication connection;

clearing the predetermined test communication connection via the network node;

registering a time of an event required for calculating the charges at a predetermined measuring point and in the network node;

registering a time of at least one additional event required for calculating the charges at at least one of the predetermined measuring point and at least one additional predetermined measuring point and in the network node, the predetermined measuring points lying outside of the network node;

determining a systematic temporal measuring error between a location of an occurrence of an actual event and the registration of the time of the event at the respective predetermined measuring point;

generating a reference data record that contains time-related data generated from the events registered at at least one of the measuring points;

generating at least one connection-related communications data record in the network node that contains time related data that describe the events registered in the network node;

correcting the time-related data of the reference data record by the systematic temporal measuring error;

comparing the reference data record to the at least one connection-related communications data record; and determining if a difference between the time-related data of the connection-related communications data record and of the reference data record lies within a predetermined range.

2. The method of claim 1 wherein the events represent at least one of the start and the end of the test communications connection and the start and the end of at least one service feature requested during the existing test communications connection.

3. The method of claim 1 wherein a switching network node is used as the network node.

4. The method of claim 1 further comprising:
assigning each measuring point at least one of a system clock or a shared system clock; and
performing a calibration between the system clocks and a time standard.

5. The method of claim 4 wherein the time difference ascertained between the system clock and the time standard at the time of calibration is used for correcting the time-related data of the reference data record.

6. The method of claim 1 wherein a called subscriber of the test communications connection is chosen as the measuring point at which the start of the connection is to be registered and a subscriber who terminates the test communications connection is chosen as the measuring point at which the end of the connection is to be registered.

7. The method of claim 6 wherein the subscriber of the use of the service feature is chosen as the measuring point at which the start of the use of a service feature requested during an existing test communications connection is to be registered and the subscriber who terminates the use is chosen as the measuring point at which the end of the use of the service feature is to be registered.

8. The method of claim 7, wherein the time-related data of the reference data record include the duration of the connection, which is ascertained by the following steps:
starting a timer is based on the start of the connection registered at the measuring point; and
stopping the timer based on the end of the connection registered at the or another measuring point.

9. The method of claim 7, wherein the time-related data of the reference data record include the duration of the use of at least one service feature requested during the test communications connection, which is ascertained by the following steps:
starting a timer based on the start of the service feature registered at a measuring point; and
stopping the timer based on the end of the use of the service feature registered at the or another measuring point.

10. A system for verifying the connection-related communications data registered by a network node, where the connection-related communications data are used for calculating charges, the system having at least one call simulator connectible to the network node, the system comprising:
at least one system clock;
a device for establishing and clearing at least one predetermined test communications connection;
at least one device for producing predetermined events required for calculating charges;
at least one device for registering the times of at least some of the events required for calculating charges,
a device for generating a connection-related reference data record containing time-related data that describe the registered events; the network node including:
a device for registering the times of at least some of the events required for calculating charges;
a network node system clock; and
a device for generating at least one connection-related communications data record containing time-related data that describe the events registered in the network node;
a correction device assigned to the call simulator having a correction value stored therein, the correction value corresponding to a systematic temporal measuring error between the location of the occurrence of an actual event and the registering of the actual event at a registration device of the call simulator, the time-related data of the connection-related reference data record being corrected by the stored systematic temporal measuring error in the correction device;
a device for comparing the connection-related reference data record to the at least one communications data record; and
a device for determining whether a difference between the time-related data of the communications data record and the connection-related reference data record lies within a predetermined range.

11. The system of claim 10 wherein the events represent at least one of the start and the end of a test communications connection and the start and the end of at least one service feature requested during the existing test communications connection.

12. The system as recited in claim 10 wherein the network node is a switching network node.

13. The system as recited in claim 10 wherein the system clocks of the call simulator are each designed to receive a standard time, such that a calibration being performed is between the system clocks and the standard time.

* * * * *